(12) United States Patent
Suzuki (10) Patent No.: US 6,356,702 B1
(45) Date of Patent: Mar. 12, 2002

(54) IMAGE DISPLAY APPARATUS AND SPECIAL PICTURE REPRODUCTION CONTROLLER

(75) Inventor: Mitsuyoshi Suzuki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/038,900

(22) Filed: Mar. 12, 1998

(30) Foreign Application Priority Data

Oct. 30, 1997 (JP) .............................................. 9-299228

(51) Int. Cl.⁷ ................................................. H04N 5/91
(52) U.S. Cl. ........................................... 386/68; 386/81
(58) Field of Search ...................... 386/6–8, 68, 81–82, 386/109, 111, 52

(56) References Cited

U.S. PATENT DOCUMENTS 5,305,113 A  *  4/1994  Iwamura et al. ............... 386/68
5,339,167 A  *  8/1994  Kuroda ......................... 386/46
5,799,129 A  *  8/1998  Muto ............................ 386/68
5,822,024 A  * 10/1998  Setogawa et al. ............. 386/52
6,009,230 A  * 12/1999  Shimoda et al. .............. 386/68
6,058,241 A  *  5/2000  Kawamura et al. ........... 386/68

FOREIGN PATENT DOCUMENTS

| JP | 8115570 | 5/1996 |
| JP | 946712 | 2/1997 |
| TW | 292383 | 12/1996 |

* cited by examiner

*Primary Examiner*—Wendy R. Garber
*Assistant Examiner*—Christopher Onuaku
(74) *Attorney, Agent, or Firm*—Leydig, Voit, & Mayer, Ltd.

(57) ABSTRACT

An image display apparatus decodes and reproduces digital data representing frames of pictures. Each frame includes at least two fields. The apparatus includes a memory having banks, each bank storing one field of a multi-field picture. The banks of the memory from which picture data is to be read when pictures are reproduced in a reverse reproduction mode are specified so that the fields are read in a reverse order from the order in which the fields are read when pictures are reproduced in a forward reproduction mode.

2 Claims, 11 Drawing Sheets

IMAGE DISPLAY APPARATUS AND SPECIAL PICTURE REPRODUCTION CONTROLLER

BACKGROUND OF THE INVENTION

1. Field of the Invention

The present invention relates to an image display apparatus for reproducing digital data representing an image and recorded on a recording medium, such as a digital video disk (DVD) or a video compact disk (VCD), and a special picture reproduction controller for controlling the image display apparatus.

2. Description of the Prior Art

When recording digital picture data obtained by converting image signals on a recording medium, such as a DVD or a VCD, the digital picture data is compressed. A MPEG (motion picture coding experts group) system, which is one of picture data compressing systems, has been examined for practical application.

A special image reproducing method proposed in, for example, JP-A No. 9-46712 to achieve special picture reproduction, such as reverse picture reproduction, of picture data recorded on a DVD uses only a frame memory necessary for ordinary forward picture reproduction. In reverse picture reproduction by this previously proposed special image reproducing method, picture data representing a group of pictures including at least one frame of an intraframe predictive coded picture (I-picture), a plurality of frames of interframe forward predictive coded picture (P-picture) and interframe bidirectional predictive coded picture (B-picture) is decoded and displayed in an order reverse to that in which the picture data is recorded on a DVD.

In reproducing picture data having a field structure in which one frame consists of two fields by such a method, the values of temporal reference (TR) information written to the picture headers of two picture data are detected, the two picture data are regarded as a pair of picture data if the two values of TR information are equal to each other, and the two picture data are combined to reproduce a picture for one frame.

Since a conventional image display apparatus and a conventional special picture reproduction controller are constituted so as to carry out the foregoing image reproducing method, picture data having a pair of fields are combined to reproduce a picture for one frame in a forward reproduction mode. Therefore, in a reverse reproduction mode, the first field and the second field of a first frame are reproduced in that order, and then the first field and the second field of a second frame which is to be reproduced before the first frame in the forward reproduction mode are reproduced in that order. If picture data is reproduced by this method in the reverse reproduction mode, a picture element which moves from the left side toward the right side on a screen when the picture data is reproduced in the forward reproduction mode moves a long distance toward the left in the first field of a frame, and then moves toward the left from a middle of the moving distance in the second field of the frame, so that the picture element moves in a zigzag way and pictures thus reproduced in the reverse reproduction mode look unnatural.

SUMMARY OF THE INVENTION

Accordingly, it is an object of the present invention to provide an image display apparatus capable of displaying pictures in natural reverse motions when reproducing picture data in a special picture reproduction mode, such as a reverse reproduction mode, a reverse slow-motion reproduction mode or a reverse high-speed reproduction mode, and a special picture reproduction controller for controlling the image display apparatus.

With the foregoing object in view, according to a first aspect of the present invention, an image display apparatus comprises a read bank specifying means for sequentially specifying banks of a memory from which picture data is read so that fields to be reproduced are reproduced in order reverse to that in which the same are read in a forward reproduction mode. When the picture data is thus reproduced in the special picture reproduction mode, such as the reverse reproduction mode, the reverse slow-motion reproduction mode or the reverse high-speed reproduction mode, pictures can be reproduced in natural reverse motions.

According to a second aspect of the present invention, an image display apparatus may further comprise a scanning line reversing means for reversing the order of scanning lines in the first field and the second field of a frame for the forward reproduction mode when reproducing pictures of frames each consisting of two fields in the reverse reproduction mode. The effect of the image display apparatus in the second aspect of the present invention is similar to that of the image display apparatus in the first aspect of the present invention.

According to a third aspect of the present invention, a special picture reproduction controller comprises a read bank specifying means for sequentially specifying banks of a memory from which picture data is read so that fields are reproduced in order reverse to that in which the fields are reproduced in a forward reproduction mode when reproducing the fields in a reverse reproduction mode. The effect of the special picture reproduction controller in the third aspect of the present invention is similar to that of the image display apparatus in the first aspect of the present invention.

According to a fourth aspect of the present invention, the special picture reproduction controller may further comprise a scanning line reversing means for reversing the order of scanning lines in the first field and the second field of a frame for the forward reproduction mode when reproducing pictures of frames each consisting of two fields in the reverse reproduction mode. The effect of the image display apparatus in the second aspect of the present invention is similar to that of the image display apparatus in the first aspect of the present invention.

BRIEF DESCRIPTION OF THE DRAWINGS

The above and other objects and advantages of the present invention will become more apparent from the following description taken in connection with the accompanying drawings, in which.

DETAILED DESCRIPTION OF THE PREFERRED EMBODIMENT

Preferred embodiments of the present invention will be described in detail with reference to the accompanying drawings.

First Embodiment

Figure 1:
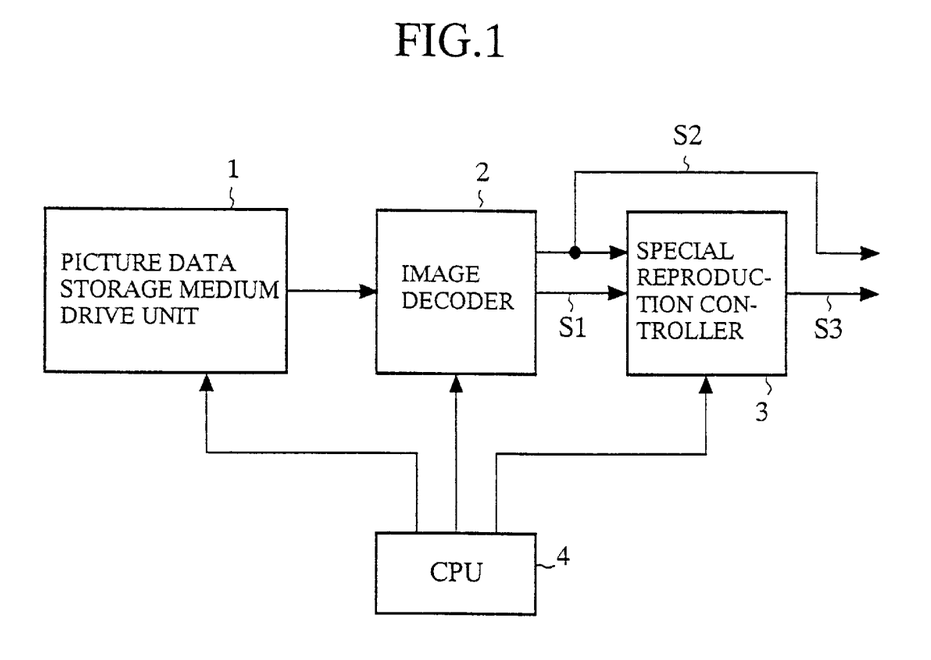
FIG. 1 is a block diagram of an image display apparatus in a first embodiment according to the present invention.

Referring to FIG. 1, there are shown a picture data storage medium drive unit 1 which drives a picture data storage medium, such as a DVD or a VCD, to read picture data from the picture data storage medium, an image decoder 2 which decodes picture data received from the picture data storage medium drive unit 1 and provides image signals and synchronizing signals separately, picture data S1 provided by the image decoder 2, a synchronizing signal S2 provided by the image decoder 2, a special picture reproduction controller 3 provided with a memory for storing the picture data S1 received from the image decoder 2 which reads the picture data from the memory and provides picture signals for special picture reproduction, such as reverse reproduction, reverse slow-motion reproduction or reverse high-speed reproduction, picture data S3 provided by the special picture reproduction controller 3, and a central processing unit (CPU) 4, i.e., a read bank specifying means, which provides control signals for controlling the operations of the picture data storage medium drive unit 1, the image decoder 2 and the special picture reproduction controller 3. In the following description of the preferred embodiments, it is assumed that image signals are coded according to the MPEG system and coded image signals are decoded according to the MPEG system. However, the image display apparatus and the special picture reproduction controller of the present invention is applicable to systems in which image signals are coded and decoded by a system other than the MPEG system.

Figure 2:
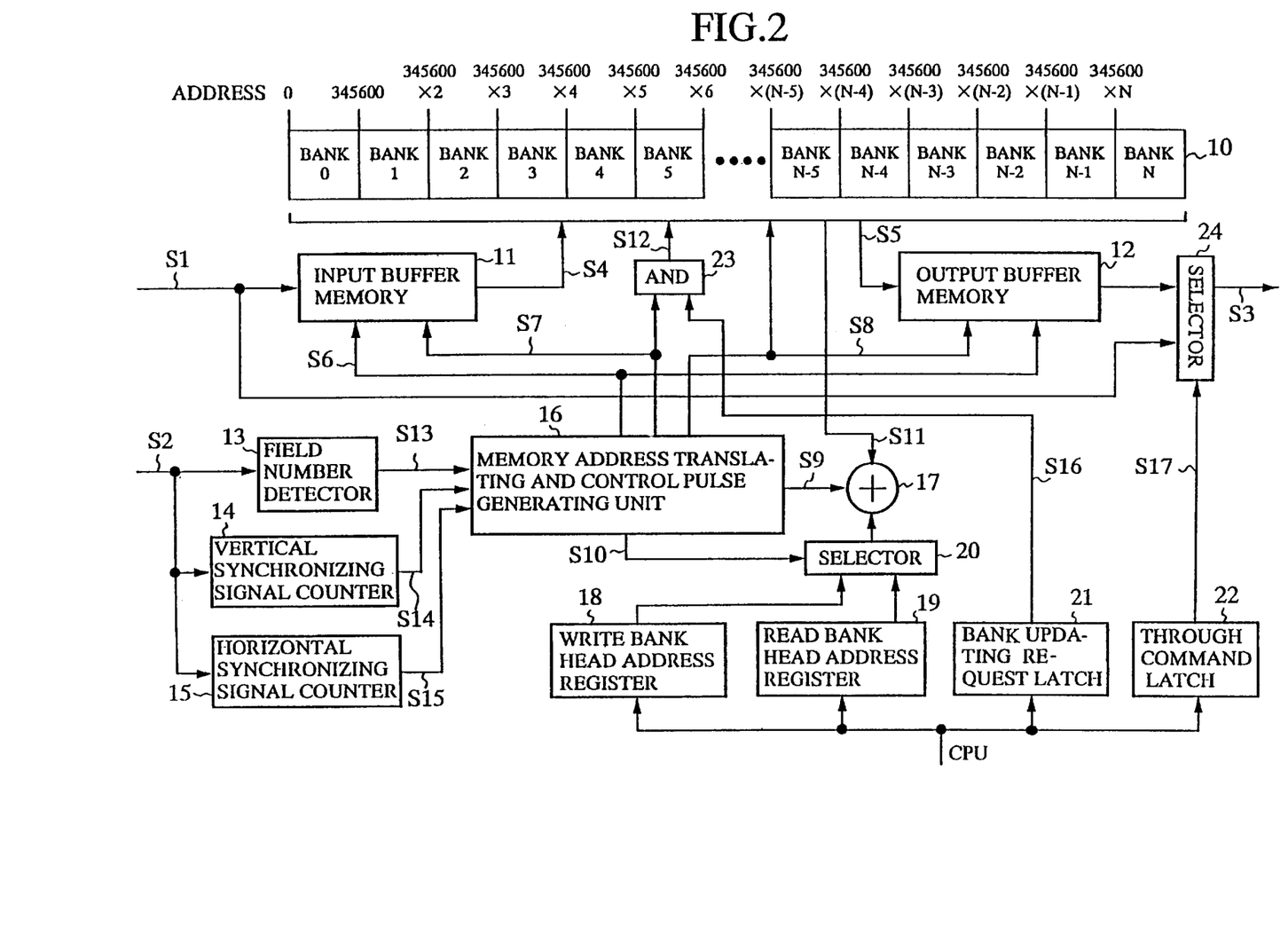
FIG. 2 is a block diagram of a special reproduction controller of FIG. 1.
Figure 4:
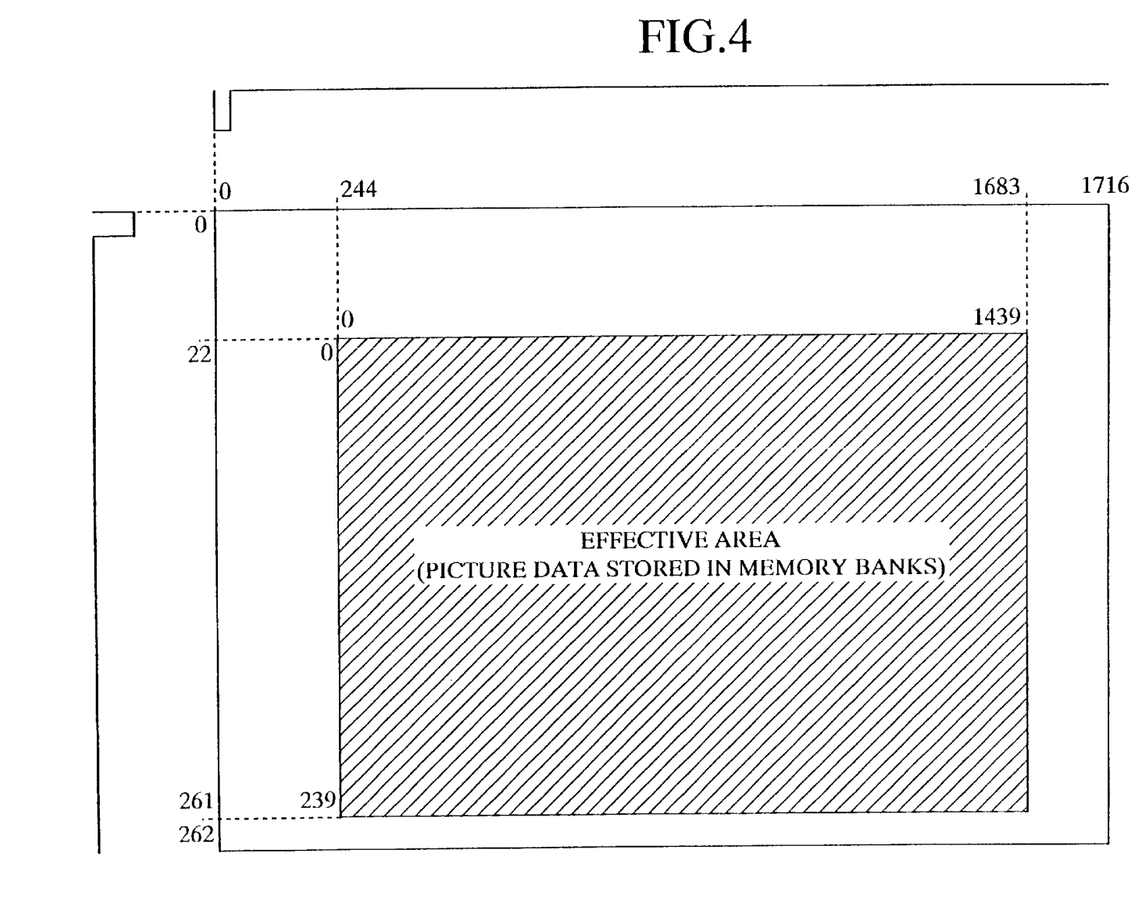
FIG. 4 is a diagram showing an effective area in a picture displayed by the image display apparatus of the first embodiment.

Referring to FIG. 2, there are shown a memory 10 consisting of N (N is a positive integer) banks large enough to store a series of picture data (an image signal stream) including one I-picture and each having a capacity of 345,600 bytes necessary for storing the picture data S1 of one frame, an input buffer memory for temporarily storing the picture data S1, picture data S4 read from the input buffer memory 11 for storage in a predetermined bank of the memory 10, picture data S5 read from a predetermined bank of the memory 10, an output buffer memory 12 for temporarily storing the picture data S5 read from the memory 10, a field number detector 13 for detecting a field number represented by a field number signal included in the synchronizing signal S2, a field number signal S13 provided by the field number signal detector 13, which being 0 to indicate a first field or 1 to indicate a second field, a vertical synchronizing signal counter 14 for counting the number of vertical synchronizing signals included in the synchronizing signal S2, a vertical synchronizing signal count S14 provided by the vertical synchronizing signal counter, the vertical synchronizing signal count S14 being in the range of 0 to 262 for the first field and being in the range of 0 to 261 for the second field, a horizontal synchronizing signal counter 15 for counting the number of horizontal synchronizing signals included in the synchronizing signal S2, a horizontal synchronizing signal count S15 provided by the horizontal synchronizing signal counter 15, the horizontal synchronizing signal count S15 being in the range of 0 to 1715, and a memory address translating and control pulse generating unit 16 which translates an address indicated by the horizontal synchronizing signal and the vertical synchronizing signal into an address corresponding to each bank of the memory 10 to store only the data in an effective area shown in FIG. 4 in the memory 10 and generates a control pulse signal for controlling operations for writing picture data to and reading picture data from the memory 10, the input buffer memory 11 and the output buffer memory 12.

Shown also in FIG. 2 are a display pulse signal S6 requesting the storage of the picture data S1 in the input buffer memory 11 and sending picture data S3 from the output buffer memory 12 to a display, not shown, an input buffer read pulse signal S7 requesting sending the picture data stored in the input buffer memory 11 to a predetermined bank of the memory 10, an output buffer write pulse signal S8 requesting reading of picture data stored in a predetermined bank of the memory 10 and writing the same picture data to the output buffer memory 12, an address number signal S9 specifying an address in a bank of the memory 10, and a bank read/write change signal S10 transferring the head address of a write bank of the memory 10 or the head address of a read bank of the memory 10.

Further shown in FIG. 2 are an adder 17 which adds the head address value of a bank to which data is written or from which data is read to an intrabank address value provided by the memory address translating and control pulse generating unit 16, an address value S11 a bank in the memory 10 or an address in a bank, a write bank head address register 18 storing the head address value of a write bank, a read bank head address register 19 (read bank specifying means) which stores the head address value of a read bank, a selector 20 for selectively providing the head address value of a write bank or a read bank, a bank updating request signal S16 requesting updating of the data stored in a predetermined bank of the memory 10, a bank updating request signal latch 21 for latching a bank updating request signal S16 during the duration of one frame, a through signal S17 directing sending out data in a real-time mode without storing the data in the memory 10, a through command latch 22 which latches the through signal S17 during a real-time data sending period, an AND circuit 23 which carries out a logical AND of the bank updating request signal S16 and the input buffer read pulse signal S7, a bank write pulse signal S12 requesting writing picture data to a bank of the memory 10, and a selector 24 which selects either picture data read from the memory 10 or picture data not stored in the memory 10.

Figure 3:
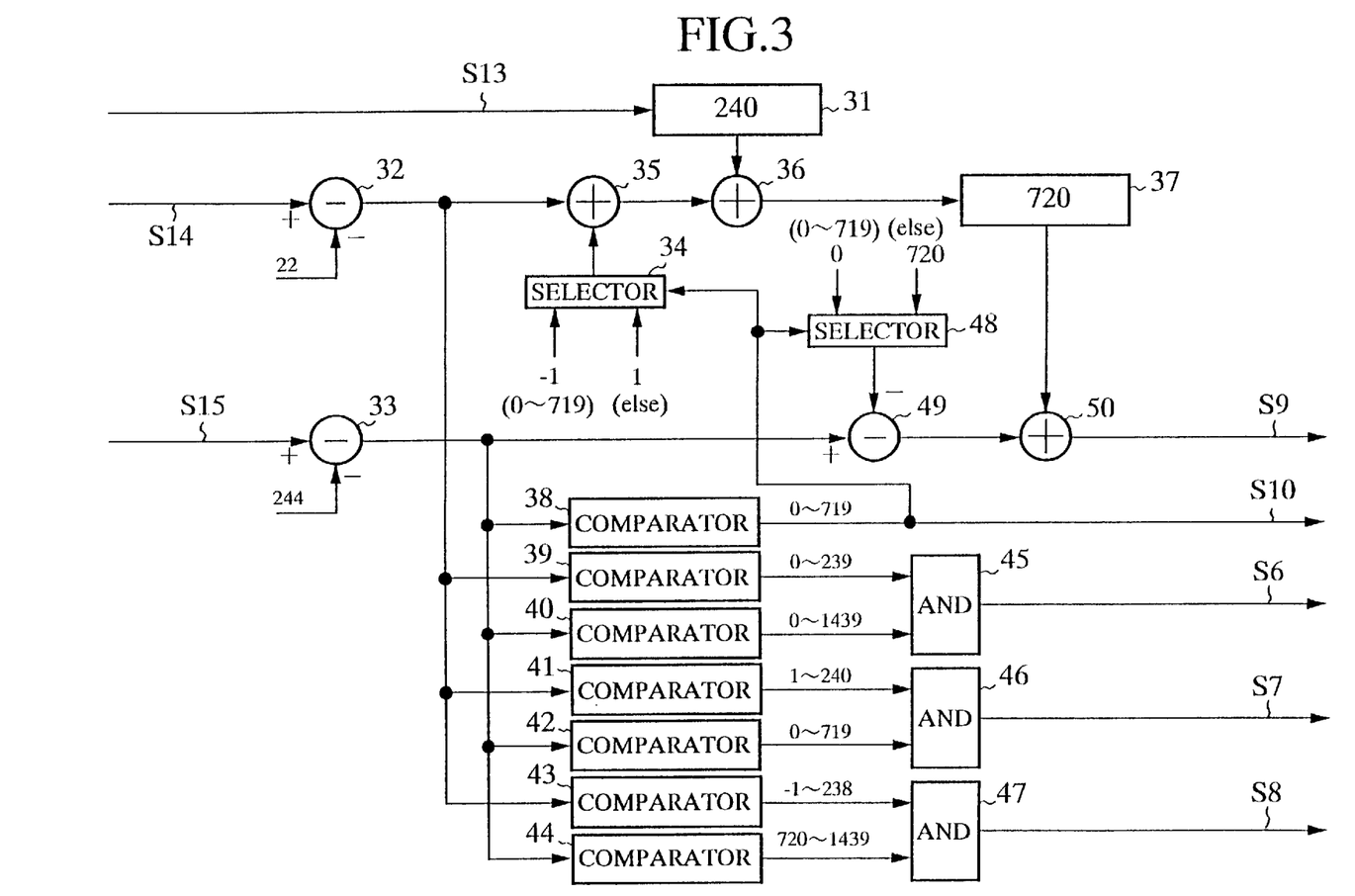
FIG. 3 is a block diagram of a memory address translating and control pulse generating unit of FIG. 2.

Referring to FIG. 3, there are shown a multiplier 31 which multiplies a field number signal S13 by 240, a subtractor 32 which subtract 22 from the vertical synchronizing signal count S14, a subtractor 33 which subtracts 244 from the horizontal synchronizing signal count S15, a selector 34 which provides a signal indicating −1 when a value in the range of 0 to 719 is given thereto and provides a signal indicating 1 when a value other than those in the range of 0 to 719 is given thereto, an adder 35 which adds the respective outputs of the subtractor 32 and the selector 34, an adder 36 which adds the respective outputs of the multiplier 31 and the adder 35, and a multiplier 37 which multiplies the output of the adder 36 by 720.

Shown also in FIG. 3 are a comparator 38 which provides a signal which goes H (high level) when a value in the range of 0 to 719 is given thereto as the bank read/write change signal S10, a comparator 39 which provides a signal which goes H when a value in the range of 0 to 239 is given thereto, a comparator 40 which provides a signal which goes H when a value in the range of 0 to 1439 is given thereto, a comparator 41 which provides a signal which goes H when a value in the range of 1 to 240 is given thereto, a comparator 42 which provides a signal which goes H when a value in the range of 0 to 719 is given thereto, a comparator 43 which provides a signal which goes H when a value in the range of −1 to 238 is given thereto, a comparator 44 which provides a signal which goes H when a value in the range of 720 to 1439 is given thereto, an AND circuit 45 which carries out logical AND between the respective outputs of the comparators 39 and 40, and provides a signal which goes H when both the outputs of the comparators 39 and 40 are H as the display pulse signal S6, an AND circuit 46 which carries out logical AND between the respective outputs of the comparators 41 and 42, and provides a signal which goes H when both the outputs of the comparators 41 and 42 are H as the input buffer read pulse signal S7, and an AND circuit 47 which carries out logical AND between the respective outputs of the comparators 43 and 44, and provides a signal which goes H when both the outputs of the comparators 43 and 44 are H as the output buffer write pulse signal S8.

Further shown in FIG. 3 are a selector 48 which provides 0 when a value in the range of 0 to 719 is given thereto and 720 when a value other than those in the range of 0 to 719 is given thereto, a subtractor 49 which subtracts the output of the selector 48 from the output of the subtractor 33, and an adder 50 which adds the respective outputs of the multiplier 37 and the subtractor 49, and provides the address value S9.

The operation of the image display apparatus will be described hereinafter.

Referring to FIG. 4, suppose that a screen for displaying one field has horizontal pixel rows each having 1715 pixels and vertical pixel rows each having 261 pixels, and an effective area excluding a vertical retrace line interval and a horizontal retrace line interval is between a pixel (245, 23) (the numeral on the left side indicates the address of the pixel with respect to the horizontal direction, and the numeral on the right side indicates the address of the pixel with respect to the vertical direction) and a pixel (1683, 261) and has 1439×239=343,921 pixels. Picture data units each including one I-picture of picture data represented by the 343,921 pixels are stored sequentially in the memory 10.

When storing the picture data about the effective area in the memory 10, the addresses of the pixels for one field must be translated; that is the address of the first pixel (245, 23) of the effective area is translated into an address value of 1 of the memory 10, and then the two-dimensional addresses, i.e., addresses indicating positions with respect to a horizontal direction and a vertical direction, of the rest of the pixels, i.e., the second pixel to the last pixel (1683, 261), are translated sequentially into one-dimensional address values of the memory 10. When translating the address, one horizontal synchronization period is divided into two and data is read from or written to the bank of the memory 10 taking into consideration that the standard of MPEG 2 specifies 720 pixels on a horizontal row and 480 pixels for two fields on a vertical row, which will be described later with reference to FIG. 6.

The picture data storage medium drive unit 1 drives the picture data storage medium and reads picture data from the picture data storage medium, and the image decoder 2 decodes the picture data. The synchronizing signal S2 and the picture data S1 provided by the image decoder 2 are given to the special picture reproduction controller 3. The field number detector 13 of the special picture reproduction controller 3 determines a field number from the synchronizing signal S2 given thereto, and gives a field number signal S13 of 0 for the first field or a field number signal S13 of 1 for the second field to the adder 31 of the memory address translating and control pulse generating unit 16. The vertical synchronizing signal counter 14 of the special picture reproduction controller 3 counts the vertical synchronizing signals and gives vertical synchronizing signal counts S14 of 0 to 262 for the first field and vertical synchronizing signal counts S14 of 0 to 261 for the second field to the subtractor 32 of the memory address translating and control pulse generating unit 16. The horizontal synchronizing signal counter 15 of the special picture reproduction controller 3 counts horizontal synchronizing signals and gives horizontal synchronizing signal counts S15 of 0 to 1715 to the subtractor 33 of the memory address translating and control pulse generating unit 16.

The subtractors 32 and 33 of the memory address translating and control pulse generating unit 16 subtract 22 and 244 from the vertical synchronizing signal count S14 and the horizontal synchronizing signal count S15, respectively, as part of an address translating operation. The output of the subtractor 32 is given to the adder 35, the comparators 39, 41 and 43, and the output of the subtractor 33 is given to the subtractor 49, and the comparators 38, 40, 42 and 44.

Suppose that the picture data storage medium drive unit 1 is reading the picture data of the first field. Then, the field number detector 13 of the special picture reproduction controller 3 provides a field number signal S13 of 0 and hence the output of the multiplier 31 is 0. If the output of the subtractor 33 is a value in the range of 0 to 719, the bank read/write change signal S10 provided by the comparator 38 goes H. Consequently, the selector 34 provides an output of −1 and the selector 48 provides an output of 0. Therefore, the respective outputs of the adders 35 and 36 are equal to a value obtained by subtracting 23 from the vertical synchronizing signal count S14, and the multiplier 37 multiplies the value obtained by subtracting 23 from the vertical synchronizing signal count S14. The output of the multiplier 37 is given to the adder 50. If the vertical synchronizing signal count S14 is 23, the output of the multiplier 37 is 0, and the output of the multiplier 37 is 720 when the vertical synchronizing signal count S14 is 24.

Since the output of the selector 48 is 0, the output of the subtractor 49 is equal to that of the subtractor 33 equal to a value obtained by subtracting 244 from the horizontal synchronizing signal count S15. The adder 50 provides a value obtained by adding a value obtained by subtracting 23 from the vertical synchronizing signal count S14 and a value obtained by subtracting 244 from the horizontal synchronizing signal count S15. The value of the output of the adder 50 is the address value S9. Incidentally, if the vertical synchronizing signal count S14 is 23, the address value S9 is 1 when the horizontal synchronizing signal count S14 is 245 and the address value of 1 specifies the first address of the bank 0 of the memory 10. The address value S9 increases as the value of the horizontal count S15 increases. Thus, the addresses of the pixels in the effective area of the screen shown in FIG. 4 are translated sequentially starting from the address of the pixel at the upper left-hand corner of the effective area, the horizontal synchronizing signal count S15 and the vertical synchronizing signal count S14 are added to determine one-dimensional addresses including the first address assigned to the first pixel in the effective area.

If the values obtained by subtracting the predetermined number from the vertical synchronizing signal counts S14 are 0 to 239 and the values obtained by subtracting the predetermined number from the horizontal synchronizing signal counts S15 are 0 to 1439, the respective outputs of the comparators 39 and 40 go H, and the display pulse signal S6, i.e., the output of the AND circuit 45, goes H. Consequently, the display pulse signal S6 is provided only for the effective area.

If the vertical synchronizing signal counts are 1 to 240 and the horizontal synchronizing signal counts are 0 to 719, the respective outputs of the comparators 41 and 42 go H, and the input buffer read pulse signal S7, i.e., the output of the AND circuit 46, goes H. Consequently, a command is given to request the transfer of the picture data S1 from the input buffer memory 11 to the memory 10 in the first half of the horizontal scanning period for scanning the effective area.

If the vertical synchronizing signal counts are −1 to 238 and the horizontal synchronizing signal counts are 720 to 1439, the respective outputs of the comparators 43 and 44 go H, and the output buffer write pulse S8, i.e., the output of the AND circuit 47 goes H. Consequently, the picture data is transferred from the memory 10 to the output buffer memory 12.

Figure 5:
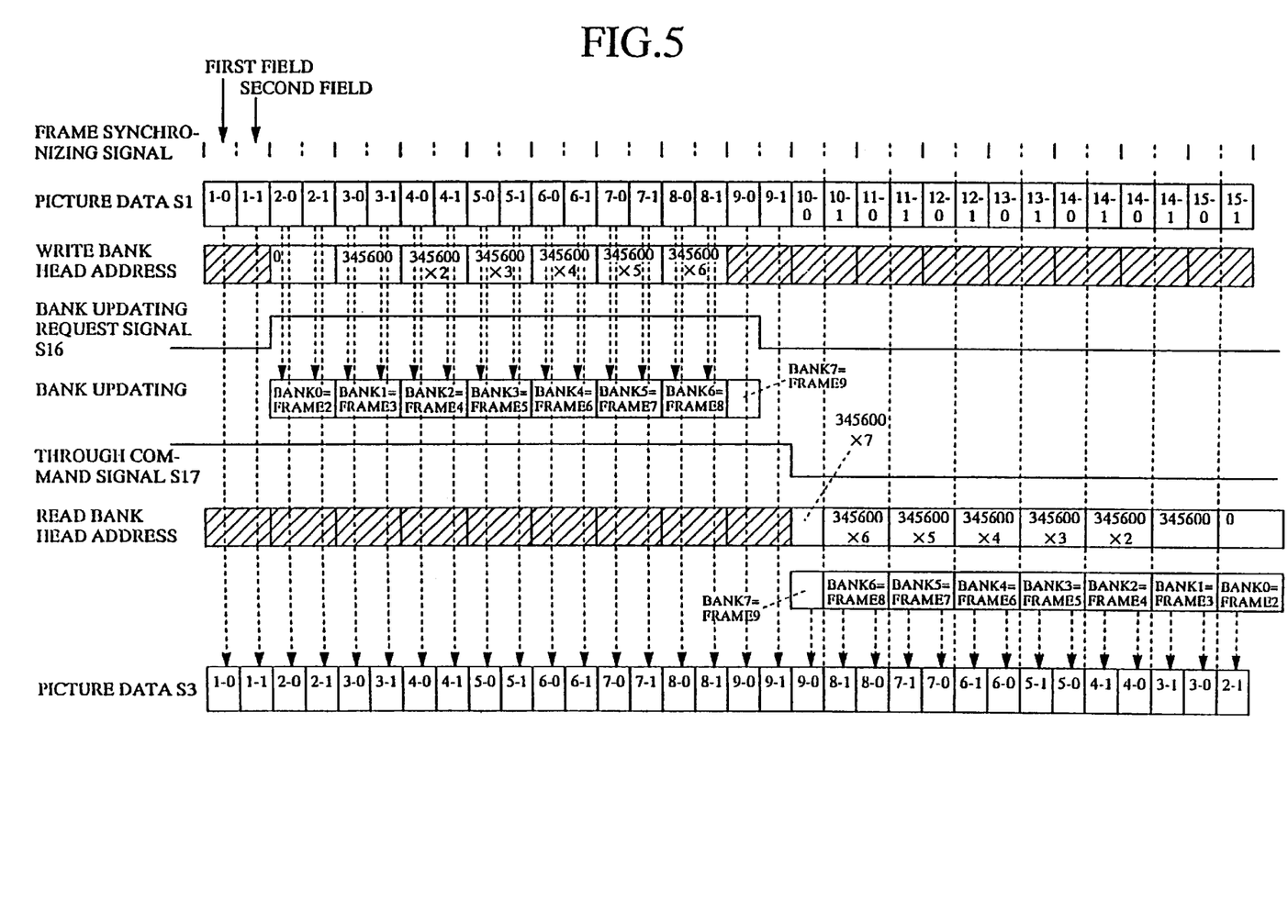
FIG. 5 is a time chart for assistance in explaining the operation of the image display apparatus of the first embodiment for the through reproduction of picture data in a forward direction or the operation of the same for the reverse reproduction of data stored in a memory one frame at a time.

Referring to FIG. 5, indicated by solid lines on the uppermost row are times when the frame synchronizing signal included in the synchronizing signal S2 is to appear, and times when the field synchronizing signal is to appear are indicated by broken lines.

Indicated on the second row are the picture data of fields; pairs of numerals 1-0, 1-1 and such indicate pairs each of a frame and a field. For example, a pair 1-0 indicates the picture data of the first field of the first frame, and a pair 1-1 indicates the picture data of the second field of the first frame.

Indicated on the third row are head addresses of the banks of the memory 10 to which the picture data is written. For example, a numeral in the first blank section indicates the head address of the bank 0, a numeral in the second blank section indicates the head address of the bank 1.

Indicated on the fourth, the fifth and the sixth row are the bank updating request signal S16, picture data of frames stored in the banks after the updating of the banks on the basis of the bank updating request signal S16, and the through signal S17, respectively.

Indicated on the seventh row are head addresses of the banks from which the picture data is to be read when reading the picture data stored in the banks of the memory 10. Indicated on the eighth row are picture data of frames stored in the banks. Indicated on the ninth row are picture data S3 provided by the special reproduction controller 3.

The image decoder 2 decodes the picture data read provided by the picture data storage medium drive unit 1 and provides the picture data S1. If the picture data S1 is transferred through the special picture reproduction controller 3 for forward reproduction, the CPU 4 gives the through signal S17 to the through command latch 22, the through command latch 22 latches the through signal S17 on H during a period shown in FIG. 5. The picture data S1 given to the special picture reproduction controller 3 is transferred directly to the selector 24 without being transferred through the input buffer memory 11, the memory 10 and the output buffer memory 12 and, as shown on the second and the ninth row in FIG. 5, the special picture reproduction controller 3 provides the picture data S3.

The memory 10 is updated in a period where the input buffer memory read pulse signal S7 is H when the bank updating request signal S16 goes H during this period. In the example shown in FIG. 5, the picture data of the frame 2 is written to the bank 0, the picture data of the fame 3 is written to the bank 1, and the picture data of the frame 9 is written to the bank 7.

If a value obtained by subtracting the predetermined value from the horizontal synchronizing signal count S15 is in the range of 0 to 719, the bank write/read change signal S10 goes H, the selector 20 of the special picture reproduction controller 3 gives the head address value of a write bank provided by the write bank head address register 18 to the adder 17. The adder 17 adds the translated address value S9 provided by the memory address translating and control pulse generating unit 16 and the head address value to give the address value S11 thus obtained to the memory 10.

The picture data S1 given by the image decoder 2 to the special picture reproduction controller 3 is stored temporarily in the input buffer memory 11, the picture data S1 is read from the input buffer memory 11 in the picture data S4 by a read operation controlled by the input buffer read pulse signal S7, and the picture data S4 is stored in an address of the memory 10 specified by the address value S11.

When the bank updating request signal S16 goes L (low level) and the through signal S17 goes L subsequently, the bank write/read change signal S10 goes L and the output buffer write pulse signal S8 goes H at time where the value obtained by subtracting the predetermined value from the horizontal synchronizing signal count is in the range of 720 to 1439, and the value obtained by subtracting the predetermined value from the vertical synchronizing signal count is in the range of −1 to 238, i.e., when in the right half of the effective area. Consequently, the selector 20 gives the read bank head address value given thereto from the read bank head address register 19 to the adder 17. The adder 17 adds the head address value to the translated address value S9 provided by the memory address translating and control pulse generating unit 16 to obtain the address value S11, and gives the address value S11 to the memory 10. The picture data stored in the memory 10 is read and transferred as the picture data S5 to the output buffer memory 12 by a picture data transfer operation controlled by the output buffer write pulse signal S8.

In the reverse reproduction mode, the CPU 4 executes a control operation to store the head address values in the read bank head address register 19 as shown on the seventh row in FIG. 5, and to read the head address values sequentially.

Therefore, the picture data S5 is stored in the output buffer memory 12 sequentially from the picture data of the frame 9 stored in the bank 7 in the decreasing order of the frame number. The picture data S5 is read from the output buffer memory 12 and is sent out as the picture data S3 through the selector 24. Therefore, the picture data S3 of the frames 9, 8, 7, . . . are reproduced sequentially in that order as shown on the ninth row in FIG. 5 for reverse reproduction. In the reverse reproduction mode, the picture data of the first field of a frame which is reproduced later in the forward reproducing mode is provided at the time corresponding to the first field, and the picture data of the second field of a frame which is reproduced earlier before the foregoing frame in the forward reproducing mode is provided at the time corresponding to the second field. More concretely, the picture data of the first field of the ninth frame is provided at the time corresponding to the first field, and the picture data of the second field of the eighth frame is provided at the time corresponding to the second field of the same frame. The picture data is provided sequentially in the foregoing manner for reverse reproduction. Thus, when the picture of an object moving from the left to the right of the screen in the forward reproducing mode is reproduced in the reverse reproduction mode, the picture will not move zigzag and will move smoothly from the right to the left of the screen during reverse reproduction.

Figure 6:
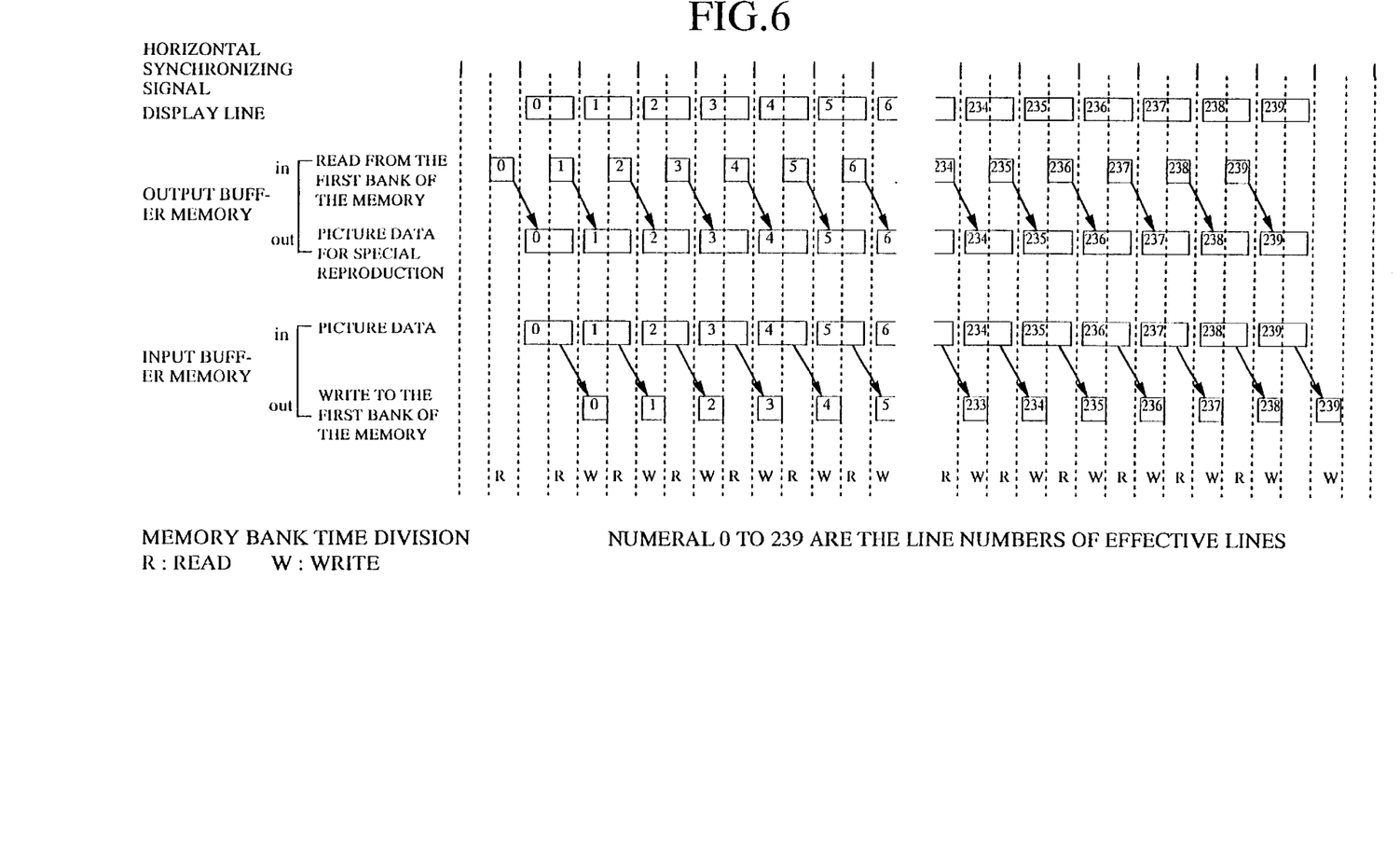
FIG. 6 is a time chart for assistance in explaining the operation of the image display apparatus of the first embodiment for transferring picture data between a memory and an output buffer memory, and between the memory and an input buffer memory.

Referring to FIG. 6, times when the horizontal synchronizing signal included in the synchronizing signal S2 is to appear are indicated on the first row and, the numbers of scanning lines are indicated on the second row. Indicated on the third and the fourth row are times when data is to be read from the memory 10 and data is to be written to the output buffer memory 12, and times when data is to be read from the output buffer memory 12. Indicated on the fifth and sixth row: are times when the picture data S1 is to be written to the input buffer memory 11 and times when the data is to be read from the input buffer memory 11 and data is to be written to the memory 10.

As is obvious from FIG. 6, a write operation for writing picture data to the output buffer memory 12 and a read operation for reading picture data from the input buffer memory 11 are carried out at a rate twice the rate at which a read operation for reading the picture data from the output buffer memory 12 and a write operation for writing the picture data to the input buffer memory 11 are carried out. When carrying out the read operation for reading picture data from the output buffer memory 12, picture data corresponding to the scanning line 0 in the j-th bank of the memory 10 is read from the memory 10 in a half period immediately before a horizontal scanning period corresponding to the scanning line 0 and is written to the output buffer memory 12. This image data is read from the output buffer memory 12 during a horizontal scanning period corresponding to the canning line 0 and is sent out as the picture data S3. Picture data corresponding to the next scanning line 1 is read from the memory 10 and is stored in the output buffer memory 12 in the second half period of the horizontal scanning period in which the picture data is read. Thus, picture data on the next scanning line are stored sequentially from an address of the output buffer memory 12 from which the picture data has been read. Therefore, the picture data read operation and the picture data write operation can be simultaneously carried out without using two output buffer memories. This holds true for the input buffer memory 11, except that the relation in rate between the read operation and the write operation for the input buffer memory 11 is reverse to that for the output buffer memory 12.

Although the number N of the banks is large enough to include one I-picture in the first embodiment, the number N of the banks may be less than the number N. The capacity of each bank may be smaller than 345,600 bytes.

Although the first embodiment has been described as applied to reverse reproduction in which the frames are reproduced in reverse order one frame at a time, the first embodiment may be applied to slow-motion reverse reproduction in which the picture data of one frame is reproduced several times, or high-speed reverse reproduction in which one out of every several frames is reproduced.

Although the first embodiment has been applied to reproducing a picture of one frame consisting of two fields, the present invention is applicable also to a picture of one frame consisting of three or more fields.

Thus, the first embodiment is capable of reproducing, in the reverse reproduction mode, the picture of an object moving in one direction when the picture is reproduced in the forward reproduction mode so that the object moves smoothly in the opposite direction.

Second Embodiment

A special picture reproduction controller in a second embodiment according to the present invention will be described with reference to FIG. 7, in which parts like or corresponding to those of the first embodiment are designated by the same reference characters and the description thereof will be omitted.

Figure 7:
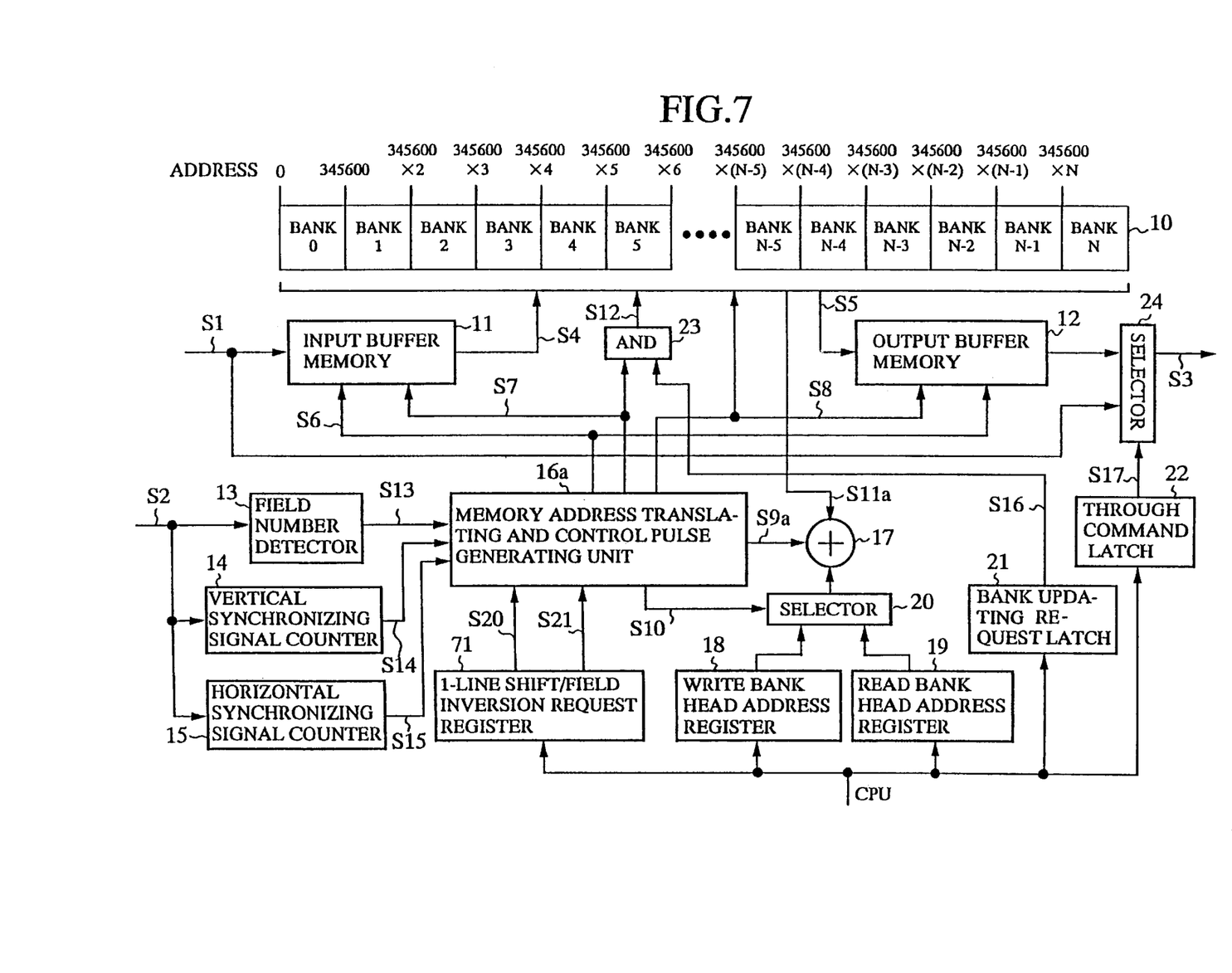
FIG. 7 is a block diagram of a special picture reproduction controller of a second embodiment according to the present invention.

Referring to FIG. 7, there are shown a memory address translating and control pulse generating unit 16a which translates address values each indicated by a horizontal synchronizing signal and a vertical synchronizing signal into address values corresponding to the banks of a memory 10 to store only data of the effective area shown in FIG. 4 in the memory 10 and generates a control pulse signal for controlling operations for writing picture data to and reading picture data from the memory 10, an input buffer memory 11 and an output buffer memory 12, an address value S9a specifying a bank in the memory 10 and an address in the bank, an address value S11a capable of specifying a bank in the memory 10 and an address in the bank, and a 1-line shift/field inversion request register (scanning line reversing means) 71 which holds a 1-line shift/field inversion request signal to reverse the first and the second field and, at the same time, to carry down the scanning line number of the second field replacing the first field by one.

Figure 8:
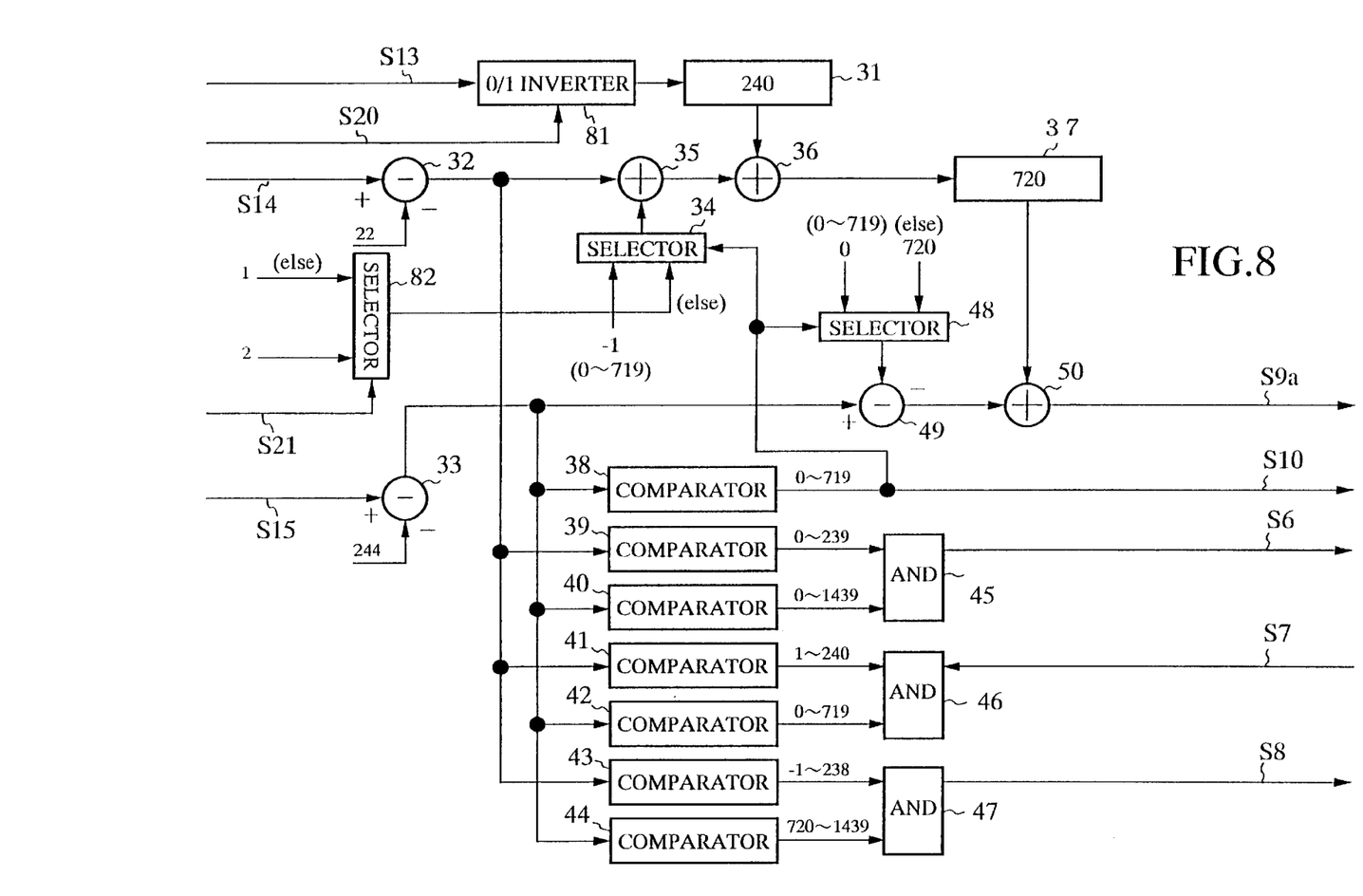
FIG. 8 is a block diagram of a memory address translating and control pulse generating unit of the special picture reproduction controller of the second embodiment.

In FIG. 8 showing the memory address translating and control pulse generating unit 16a, parts like or corresponding to those shown in FIG. 3 are designated by the same reference characters and the description thereof will be omitted.

Referring to FIG. 8, there are shown a field shift request signal S20 requesting the shift of fields, 0/1 inverter 81 which inverts the order of 0 and 1 of a field number signal S13, i.e., an inverter which provides 1 when 0 is given thereto and vice versa, 1-line shift request signal S21 requesting carrying down scanning line number, and a selector (scanning line reversing means) 82 which provides a signal of 1 in the normal state and provides a signal of 2 when the 1-line shift request signal S21 is H.

The operation of the memory address translating and control pulse generating unit 16a will be described hereinafter.

Figure 9:
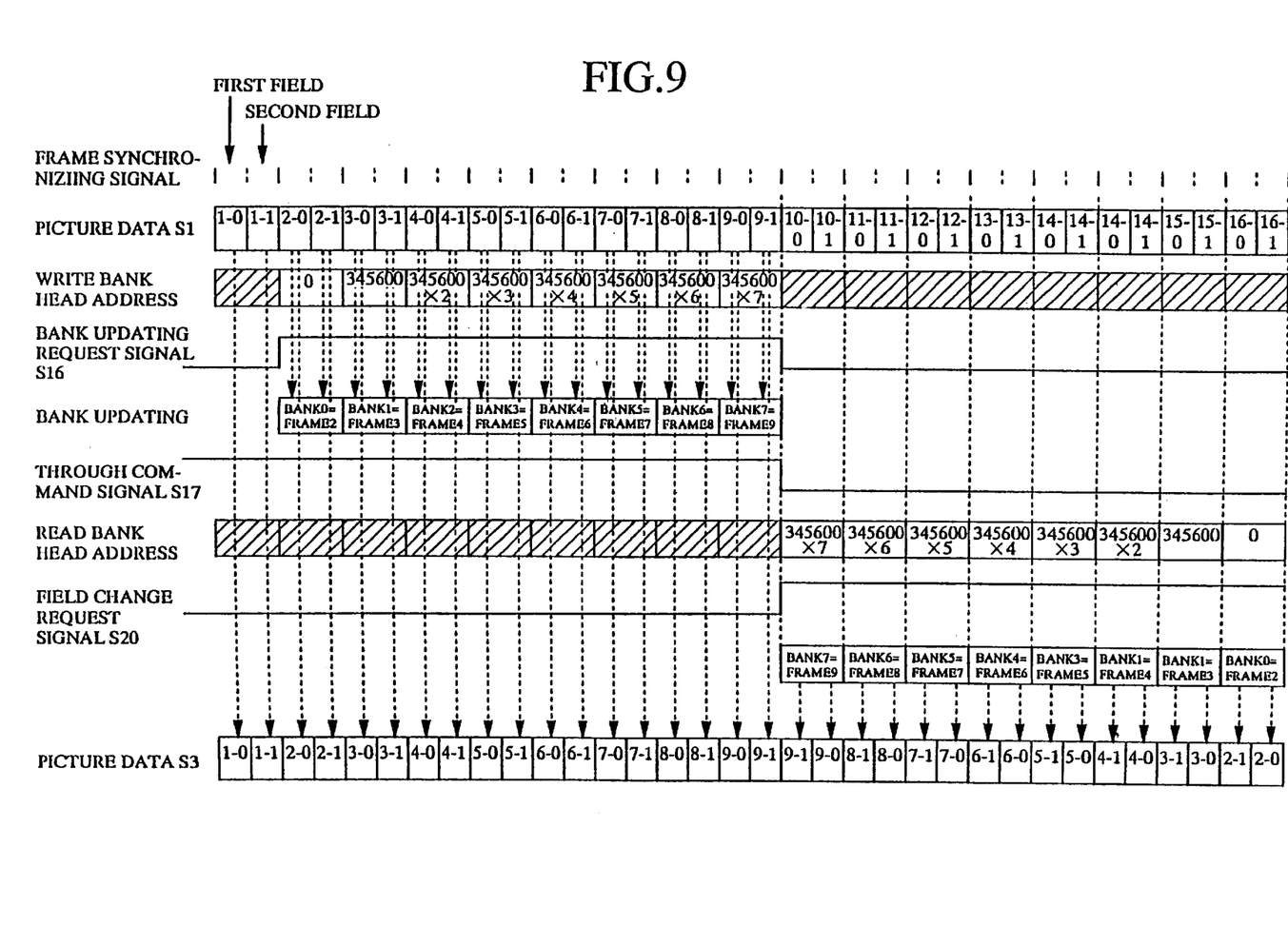
FIG. 9 is a time chart for assistance in explaining the operation of the special picture reproduction controller of the second embodiment for the through reproduction of picture data in a forward direction or the operation of the same for the reverse reproduction of data stored in a memory.

The first to the seventh row of FIG. 9, similarly to those of FIG. 5, indicate times when the frame synchronizing signal is to be given, picture data S1, the head addresses of banks of the memory 10, the bank updating request signal S16, frame picture data stored in the banks, a through signal S17, and the head addresses of the banks from which picture data is to be read. Indicated on the eighth row is the field shift request signal S20, on the ninth row is frame s of the banks from which picture data is to be read, and on the tenth row is picture data S3 sent out from a special reproduction controller 3.

Operations for transferring the picture data S1 through the special reproduction controller 3 for forward reproduction are the same as those of the first embodiment. When the bank updating request signal S16 and the through signal S17 go L and the field shift request signal S20 goes H, a reverse reproduction mode is set. In the reverse reproduction mode, the bank write/read change signal S10 goes L and the output buffer write pulse signal S8 goes H in a period corresponding to the right half of the effective area. Consequently, the selector 20 transfers a read bank head address value received from the read bank head address register 19 to the adder 17. The adder 17 adds this head address value to the translated address value S9 provided by the memory address translating and control pulse generating unit 16a and gives an address value S11 to the memory 10. The picture data stored in the memory 10 is read and the picture data S5 thus read is transferred to the output buffer memory 12 by operations controlled by the output buffer write pulse signal S8.

The CPU makes the 1-line shift/field inversion request register 71 provide the field change request signal S20 and the 1-line shift request signal S21. Then, the order of 0 and 1 in the output signal of the 0/1 inverter 81 indicating a field number is inverted, and the selector 82 provides a signal indicating 2. Consequently, the output of the selector 34 is 2 in the period corresponding to the second half of the effective area with respect to the horizontal direction (a period in which data is written to or read from the output buffer memory 12), 2 is added to a value obtained by subtracting 22 from the vertical synchronizing signal count S14 to carry down the scanning line by one.

When reverse reproduction is desired, the CPU 4, as in the first embodiment, stores head address values in the read bank head address register 19 in order as indicated on the seventh row in FIG. 5, and the head address values are read sequentially, so that picture data S5 of frame numbers stored in the bank 7 are read and stored sequentially in the output buffer memory 12 in the increasing order of frame number starting from the picture signal of the frame 9. The picture data stored in the output buffer memory 12 is read and is sent out through the selector 24 as the picture data S3. The picture data of the frame 9, the frame 8, the frame 7, . . . are reproduced sequentially in the descending order of frame number as indicated on the ninth row in FIG. 5 for reverse reproduction. In the second embodiment, the 0/1 inverter 81 shifts the field numbers. Therefore, the picture data of the second field among a pair of fields forming one frame in the forward reproduction mode is provided at the time for the first field and the picture data of the first field is provided at the time for the second field; that is, as shown in the tenth row in FIG. 9, the picture data of the second field of the ninth frame is provided at the time for the first field and that of the first field is provided at the time for the second field.

Figure 10:
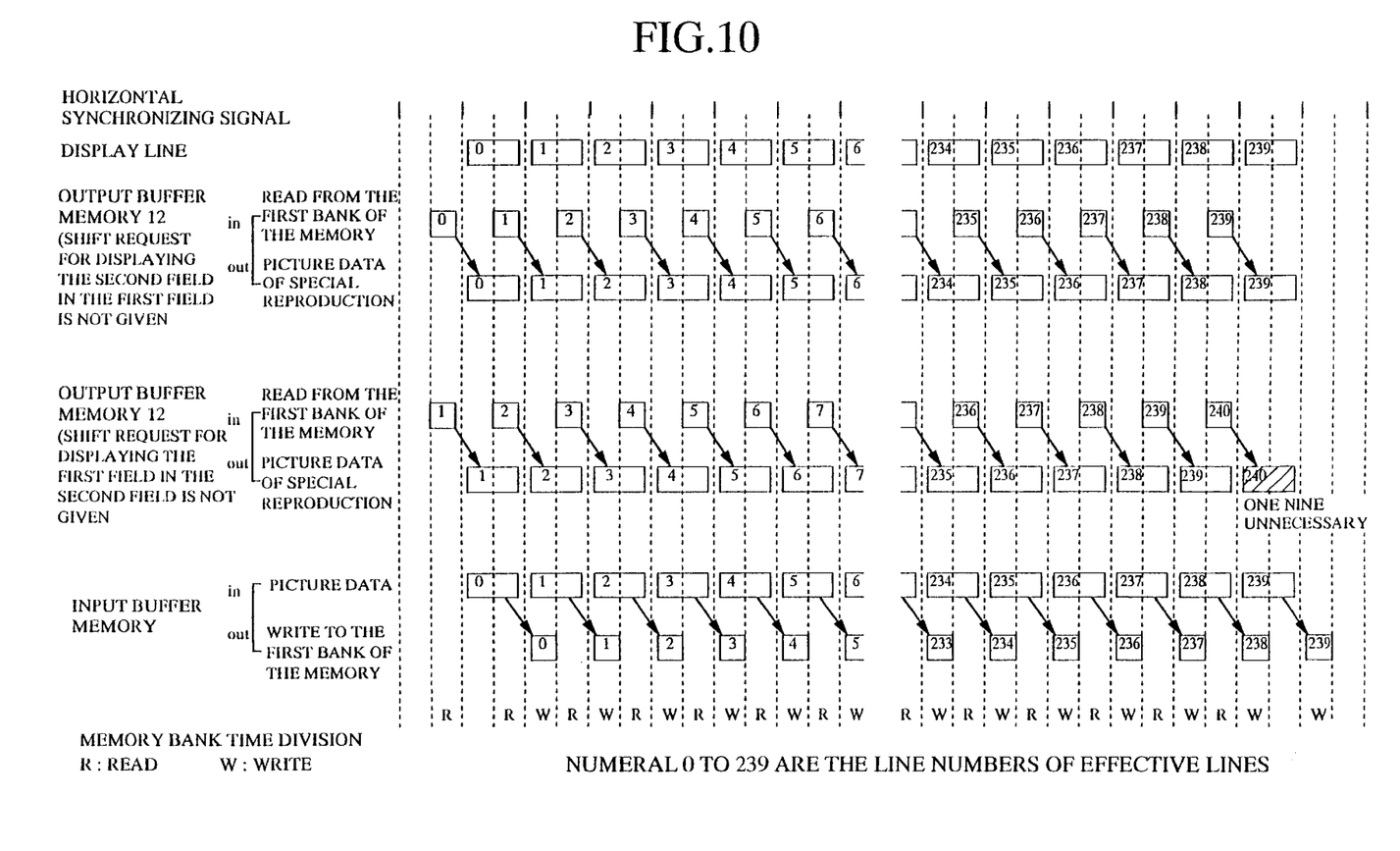
FIG. 10 is a time chart for assistance in explaining the operation of the special picture reproduction controller of the second embodiment for transferring picture data between a memory and an output buffer memory and between the memory and an input buffer memory.

Referring to FIG. 10, times when the horizontal synchronizing signal included in the synchronizing signal S2 is to appear are indicated on the first row and, the numbers of scanning lines are indicated on the second row. Indicated on the third and the fourth row are times when data is to be read from the memory 10 and data is to be written to the output buffer memory 12, and times when data is to be read from the output buffer memory 12 when neither a field shift request nor a 1-line shift request is made. Indicated on the fifth and the sixth row are times when data is to be read from the memory 10 and data is to be written to the output buffer memory 12, and times when data is to be read from the output buffer memory 12 when a field shift request and a 1-line shift request are made. Indicated on the seventh and the eighth row are times when the picture data S1 is to be written to the input buffer memory 11 and times when the data is to be read from the input buffer memory 11 and data is to be written to the memory 10.

As is apparent from FIG. 10, a write operation for writing picture data to the output buffer memory 12 and a read operation for reading picture data from the input buffer memory 11 when neither a field shift request nor a 1-line shift request is made are the same as those in the first embodiment. When a field shift request and a 1-line shift request are made, the second field and the first field are interchanged and, at the same time, the number of scanning lines of the first field is carried down by one (only carry down of scanning lines is shown in FIG. 10).

Figure 11A:
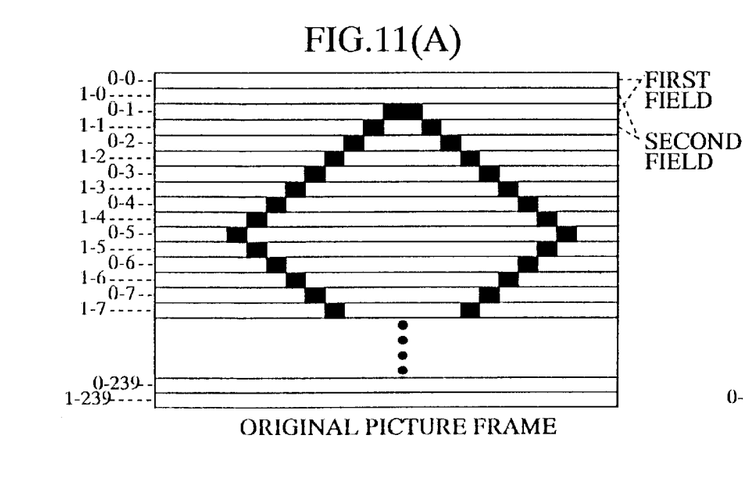
FIGS. 11(A) to 11(C) are pictorial views of pictures reproduced in a reverse reproduction mode by the special picture reproduction controller of the second embodiment.
Figure 11B:
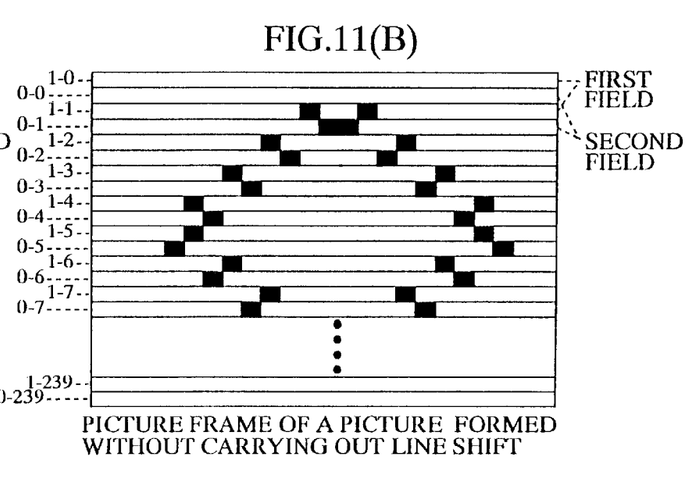
Figure 11C:
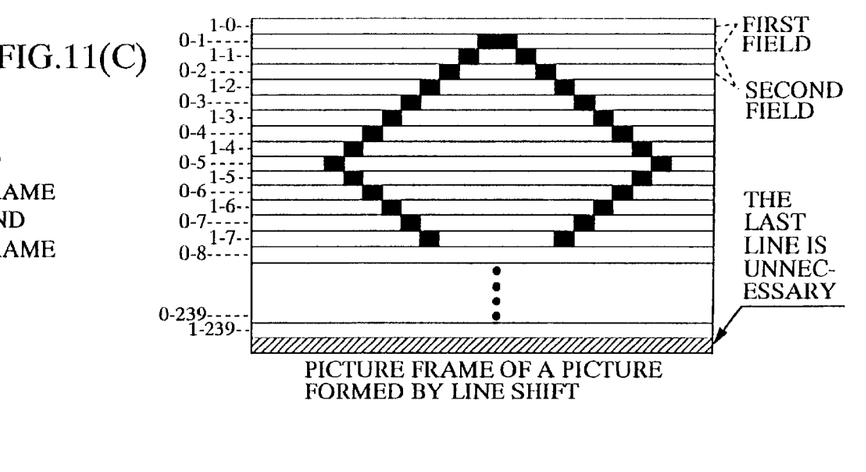

Therefore, when an original picture shown in FIG. 11(A) by way of example is reproduced in the reverse reproduction mode, pictures on a pair of adjacent scanning lines are reproduced in the reverse order as shown in FIG. 11(B) if neither field change request nor 1-line shift request is made. If a field change request and a 1-line shift request are made, pictures on the scanning lines are reproduced in the same order as that in the original picture as shown in FIG. 11(C).

Although this embodiment carries down the scanning line number of the second field by 1, the scanning line number of the first field may be carried up by 1. The number N of the banks may be less than the number N and the capacity of each bank may be smaller than 345,600 bytes.

Although the second embodiment has been described as applied to reverse reproduction in which the frames are reproduced in reverse order one frame at a time, the second embodiment may be applied to slow-motion reverse reproduction in which the picture data of one frame is reproduced several times, or high-speed reverse reproduction in which one out of every several frames is reproduced.

Thus, the second embodiment is capable of reproducing, in the reverse reproduction mode, pictures on the scanning lines that are not inverted and the picture can be reproduced in the reverse reproduction mode in a natural reverse-reproduced picture.

Although the invention has been described in its preferred embodiments, the description is illustrative and many changes and variations are possible therein without departing from the scope and spirit of the present invention as set forth in appended claims.

What is claimed is:

1. An image display apparatus for decoding and reproducing digital picture data organized in frames, each frame representing a picture, each frame consists of a first field and a second field, said image display apparatus comprising:

a memory including a plurality of banks, each bank storing one field of a frame;

read bank specifying means for sequentially specifying the banks of the memory from which fields are read in a reverse reproduction mode of reproducing the pictures so that the fields are specified in an order reverse to an order in which the fields read are specified in a forward reproduction mode of reproducing the pictures; and scanning line inverting means for inverting a vertical relationship between scanning lines of the first field and of the second field in the forward reproduction mode when said apparatus is operating in the reverse reproduction mode.

2. A special reproduction controller for an image display apparatus for decoding and reproducing digital picture data organized in frames, each frame representing a picture, each frame consists of a first field and a second field, said special reproduction controller comprising:

a memory including a plurality of banks, each bank storing one field of a frame; and read bank specifying means for sequentially specifying the banks of the memory from which fields are read in a reverse reproduction mode of reproducing the pictures so that the fields are specified in an order reverse to an order in which the fields read are specified in a forward reproduction mode of reproducing the pictures; and scanning line inverting means for inverting a vertical relationship between scanning lines of the first field and of the second field in the forward reproduction mode when said apparatus is operating in the reverse reproduction mode.

* * * * *